United States Patent [19]

Kong

[11] Patent Number: 4,796,732
[45] Date of Patent: Jan. 10, 1989

[54] PISTON CYLINDER TYPE OIL DAMPER

[75] Inventor: Alan Kong, Kawasaki, Japan

[73] Assignee: Nifco Inc., Yokohama, Japan

[21] Appl. No.: 70,739

[22] Filed: Jul. 7, 1987

[30] Foreign Application Priority Data

Jul. 10, 1986 [JP] Japan ................... 61-160926

[51] Int. Cl.⁴ .................. F16F 9/19; F16F 9/50
[52] U.S. Cl. ...................... 188/282; 188/315;
    188/316; 188/317; 188/322.15; 188/322.22;
    188/322.13; 267/221; 267/226; 137/513.3
[58] Field of Search ............... 137/513.3, 538;
    188/282, 281, 322.15, 322.13, 322.19, 322.22,
    280, 269, 270, 284, 286, 287, 313-318, 298;
    267/64.11, 64.15, 221, 226; 92/12, 8, 143;
    16/51, 52

[56] References Cited

U.S. PATENT DOCUMENTS

| | | | |
|---|---|---|---|
| 1,164,371 | 12/1915 | Lovejoy | 188/282 |
| 1,401,111 | 12/1921 | Sigel | 188/282 |
| 1,530,632 | 3/1925 | Watson | 188/282 |
| 1,616,091 | 2/1927 | Scott | 188/282 |
| 1,620,112 | 3/1927 | Lewis | 188/282 |
| 1,806,338 | 5/1931 | Elsey | 188/322.15 X |
| 1,950,639 | 3/1934 | Thompson | 188/281 X |
| 1,950,685 | 3/1934 | McGee | 188/282 |
| 2,092,259 | 9/1937 | Padgett | 188/322.15 |
| 2,320,697 | 6/1943 | Binder | 188/322.15 X |
| 2,336,137 | 12/1943 | Thornhill | 188/322.15 X |
| 2,352,197 | 6/1944 | Harvey | 188/282 |
| 2,379,750 | 7/1945 | Rossman | 188/284 |
| 2,868,536 | 1/1959 | Jungles | 188/317 X |
| 2,916,281 | 12/1959 | Hehn | 188/317 X |
| 3,001,799 | 9/1961 | Plume | 137/513.3 X |
| 3,066,767 | 12/1962 | Djordjevitch | 188/322.15 X |
| 3,205,789 | 9/1965 | Mandelko | 188/317 X |
| 3,256,005 | 6/1966 | Taylor | 267/64.13 |
| 3,361,422 | 1/1968 | Theuleau | 188/281 X |
| 3,389,766 | 6/1968 | Henry-Biaband | 188/317 |
| 3,412,870 | 11/1968 | Rollins | 188/317 X |
| 3,444,965 | 5/1969 | Dobkins | 188/282 |
| 3,531,065 | 9/1970 | Brown | 188/287 X |
| 3,616,881 | 11/1971 | Nicholls | 188/322.15 X |
| 3,647,239 | 3/1972 | Katsumori | 267/64.11 X |
| 3,724,615 | 4/1973 | Stormer | 188/322.22 X |
| 3,826,343 | 7/1974 | Heymann | 188/317 X |
| 3,889,787 | 6/1975 | Zehring et al. | 188/322.15 X |
| 3,904,182 | 9/1975 | Allinquant et al. | 188/282 X |
| 4,059,175 | 11/1977 | Dressell, Jr. et al. | 188/322.15 X |
| 4,171,712 | 10/1979 | DeForrest | 137/538 X |
| 4,265,344 | 5/1981 | Taylor | 267/64.13 X |
| 4,325,468 | 4/1982 | Siorek | 188/322.15 X |
| 4,356,898 | 11/1982 | Guzder et al. | 188/317 X |
| 4,381,857 | 5/1983 | Cook | 267/64.15 |
| 4,407,396 | 10/1983 | Sirven | 188/315 X |
| 4,428,567 | 1/1984 | Fournales | 188/317 X |
| 4,433,759 | 2/1984 | Ichinose | 188/282 |
| 4,478,387 | 10/1984 | Postema | 188/322.15 X |
| 4,526,088 | 7/1985 | Reuschenbach et al. | 188/317 X |
| 4,532,856 | 8/1985 | Taylor | 267/64.13 X |
| 4,602,707 | 7/1986 | Zumwinkel et al. | 188/315 |

FOREIGN PATENT DOCUMENTS

58-174038 10/1983 Japan.

*Primary Examiner*—Douglas C. Butler
*Attorney, Agent, or Firm*—Trexler, Bushnell, Giangiorgi & Blackstone, Ltd.

[57] ABSTRACT

An elongation type oil damper includes a cylinder containing oil in the inside, a hollow plunger slidably fitted in the cylinder, containing oil in the inner space thereof and projecting from a rod end of the cylinder for undergoing elongation and contraction strokes, and a floating piston inserted in the inner space of the plunger for axial movement in a state biased toward the end of the plunger projecting into the cylinder. The plunger is provided at the projecting end thereof with communication holes through which the oil in the plunger and the oil in the cylinder join each other and also with a valve capable of being moved axially to close some of the communication holes in the elongation or contraction stroke of the plunger.

2 Claims, 4 Drawing Sheets

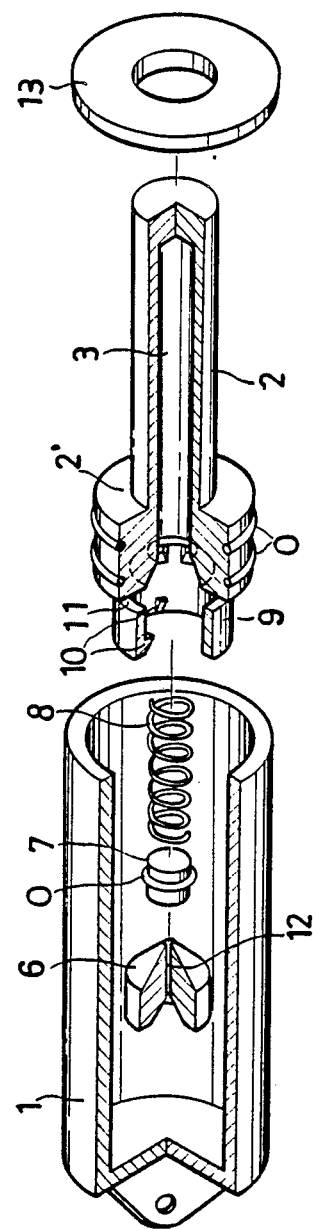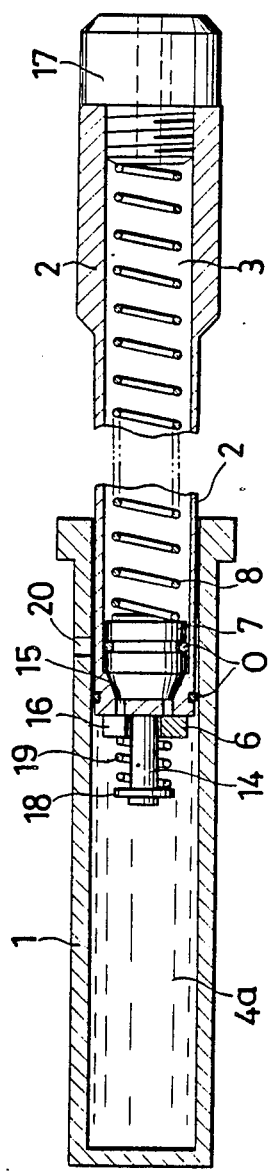

PISTON CYLINDER TYPE OIL DAMPER

BACKGROUND OF THE INVENTION

This invention relates to a piston-cylinder type oil damper and, more particularly, to a piston-cylinder type oil damper, which serves to brake the door of a glove compartment in the passenger compartment of a car such that it opens smoothly instead falling open suddenly under its own weight and the weight of accommodated articles or to brake the disk loading table of a compact disk player or the like to prevent it from being pulled or pushed rapidly out of the player by a spring, but which nevertheless permits the door or table to be returned to the initial state without need of extra power.

Prior Art

As a piston-cylinder type damper of this type, one based on pneumatic action is proposed in Japanese patent Public Disclosure SHO No. 58-174038.

In this damper, the piston rod is elongated with respect to the cylinder when the loading table projects out of the player. Also, the negative pressure produced in the head chamber in the cylinder is used to control the quantity of air taken into the chamber, thus effecting braking by the action of the negative pressure. Further, when returning the open door or the projected table, the piston rod is pushed into the cylinder, so that air in the head chamber of the cylinder is quickly exhausted to the outside when the piston rod is pushed.

In the above piston-cylinder type air damper, when the maximum volume of the head chamber of the cylinder is constant and the flow rate of air taken into the head chamber at the time of the elongation of the piston rod is constant, the braking power is constant, so that it is impossible to vary the size of the braking force depending on the purpose of use.

Therefore, it is necessary to control the diameter of the cylinder or the rate of flow of air taken into the head chamber at the time of the elongation of the piston rod depending on the use, and the design has to be altered for each purpose.

OBJECT AND SUMMARY OF THE INVENTION

An object of the invention is to provide a piston-cylinder type oil damper, which permits the braking force to be set at given strengths by using oils of different viscosities in the cylinder.

Another object of the invention is to provide a piston-cylinder type oil damper, which permits the diameter of the rod to be substantially the same as the inner diameter of the cylinder and has excellent mechanical strength when in reduced size.

According to the invention, there is provided an elongation type oil damper, which comprises a cylinder containing oil in the inside, and a hollow plunger slidably fitted in the cylinder with oil provided in the inner space and projecting from the rod end of the cylinder for undergoing an elongation stroke and a contraction stroke, the plunger being provided at the end projecting into the cylinder with communication holes through which oil in the inner space and oil in the cylinder join each other and also with a valve capable of being moved axially to close some of the communication holes in the elongation or contraction stroke of the plunger, a floating piston being inserted in the inner space for axial movement in a state biased toward the projection end.

Depending on whether the valve capable of axial movement closes some of the communication holes in the elongation stroke or the contraction stroke of the plunger, in this stroke oil in the cylinder and that in the inner space of the plunger can join each other only through the communication holes that remain open. Thus, the movement of the plunger is braked. In the other stroke, however, oil can pass through all the communication holes in the open state, so that the movement of the plunger is not braked. Further, since the plunger is provided with inner space for accommodating oil, the inner diameter of the plunger projecting from the rod end of the plunger can be made substantially the same as the inner diameter of the cylinder. Thus, even with a small size oil damper with a small cylinder inner diameter, it is possible to obtain excellent mechanical strength and reliable operation.

The above and other objects and features of the invention will become more apparent from the following detailed description with reference to the accompanying drawings.

BRIEF DESCRIPTION OF THE DRAWINGS

FIG. 3 is an exploded perspective view, partly in section, showing the oil damper of FIG. 1;

FIG. 4 is a sectional view showing a second embodiment of the oil damper according to the invention with the plunger in the elongated state;

DETAILED DESCRIPTION OF THE PREFERRED EMBODIMENT

Figure 1:
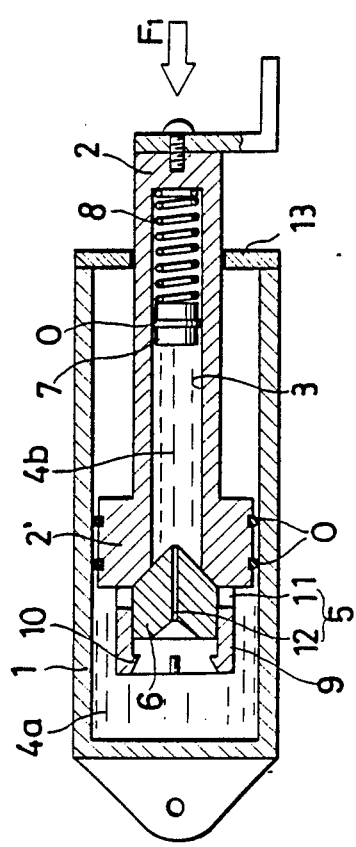
FIG. 1 is a sectional view showing a first embodiment of the oil damper according to the invention during a contraction stroke of the rod.

In the illustrated embodiment, reference numeral 1 designates a cylinder, numeral 2 a plunger having a central bore, numeral 4a oil in the cylinder, numeral 4b oil in the space of the plunger, numeral 5 communication holes, numeral 6 a valve, numeral 7 a floating piston,, numeral 8 a spring for biasing the floating piston, and symbol O an O-ring. The cylinder 1, plunger 2, valve 6 and floating piston 7 are plastic moldings.

Figure 2:
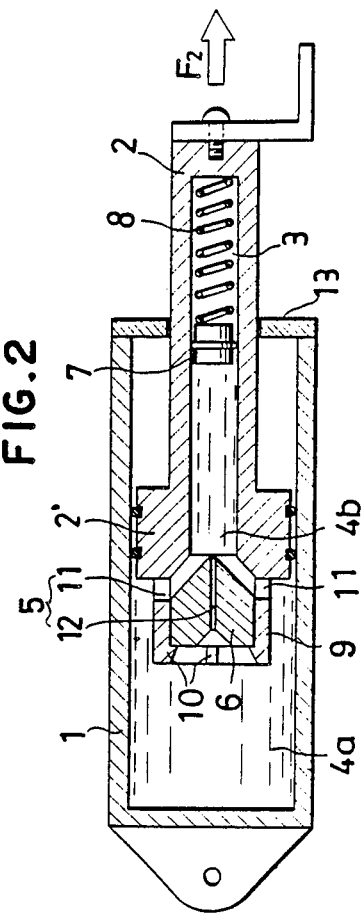
FIG. 2 is a sectional view showing the oil damper of FIG. 1 during an elongation stroke of the rod.
Figure 5:
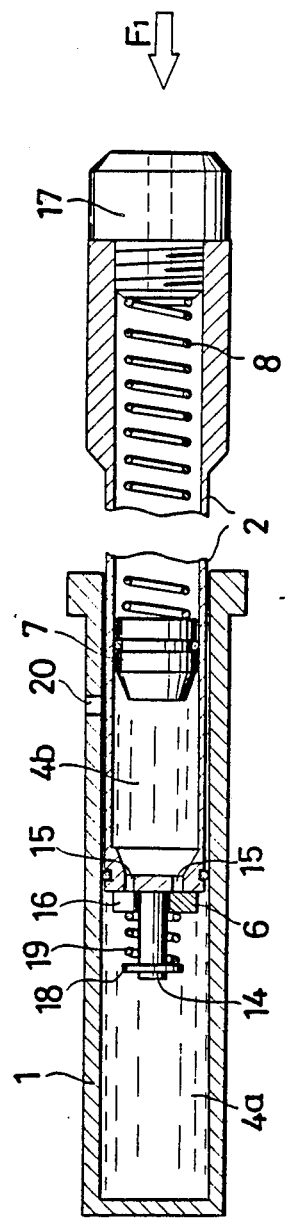
FIG. 5 is a sectional view showing the plunger of the oil damper of FIG. 4 during the contraction stroke.

The plunger 2 in the first embodiment shown in FIGS. 1 to 3 is provided with a cylindrical projection 9 in front of a slide section 2' in sliding contact with the inner periphery of the cylinder, i.e., at a projecting end projecting into the cylinder. The cylindrical projection 9 has a reduced diameter and is open at the front. A valve 6 is fitted for axial movement in the inner periphery of the cylindrical projection 9.

The front end of the inner periphery of the cylindrical projection 9 is provided with a plurality of check pawls 10 spaced apart in the circumferential direction. The valve 6 is forced into the inner periphery of the cylindrical projection by causing deformation of the check pawls 10. The detachment of the valve 6 in the releasing direction is thus prevented by the check pawls 10.

The cylindrical projection 9 is provided at the rear end, i.e., at a position not closed from the inner side by the valve 6 when the same is advanced, with a plurality of large holes 11 having large areas of opening. The valve itself has a central axial through-hole 12 having a small area. The holes 11 and 12 constitute the communication holes 5.

FIG. 1 shows the plunger 2 undergoing a contraction stroke while experiencing a force F1 applied in the direction of forcing the plunger into the cylinder 1. The valve 6 is retracted by the pressure of oil 4a in the cylinder acting from the open front end of the cylindrical projection 9 on the front surface of the valve 6, thus closing the holes 11 of the communication holes from the inner side. In this state, the oil 4a in the cylinder 1 can join the oil 4b in the plunger space 3 by entering the same only through the remaining small hole 12 of the communication holes 5 in the valve 6. In this way, the plunger is-braked in the contraction stroke. At this time, the floating piston 7 is retracted against the spring 8 by the oil entering the plunger space.

FIG. 2 shows the plunger executing an elongation stroke with application of a tension force F2. At this time, the plunger is moved in a withdrawal direction with respect to the cylinder. Thus, a negative pressure is produced in the cylinder, and with this negative pressure the valve 6 is moved in the advancing direction to open the holes 11 of the communication holes 5.

Thus, the oil 4b in the plunger space is withdrawn into the cylinder 1 through all the communication holes 5, i.e., communication holes 11 to join the oil 4a in the cylinder. Thus, the elongation stroke is performed smoothly. At this time, the floating piston 7 is advanced gradually with the restoring force of the spring 8.

Thus, in the contraction state of the plunger 2, almost all the oil is collected in the space 3. In contrast, in the elongation state, almost all oil is in the cylinder is collected to brake the contraction stroke.

In this embodiment, the diameter of the plunger 2 projecting outwardly from the rod end of the cylinder 1 can be increased up to an extent slightly smaller than the inner diameter of the cylinder 1, but substantially the same as the inner diameter of the cylinder, if necessary (up to the same diameter as the sliding section with O-rings fitted on the outer periphery).

It is possible to omit an annular lid 13 for closing the rod end of the cylinder 1.

In the embodiment shown in FIGS. 4 to 9, the plunger 2 has an outer diameter which is substantially the same as the inner diameter of the cylinder for a portion capable of entering the cylinder 1 in the contraction stroke, and is slightly increased for the trailing portion. The plunger has a shaft 14 extending forward from the center of the end projection into the cylinder. It has a sectional shape other than a circular shape, e.g., a keyhole-like shape. Around the root of the shaft 14, four small holes 15 are provided at a phase of 90°, these small holes 15 constituting communication holes 5.

The valve 6 is a plate-like member capable of movement in the axial direction along the shaft 14. It has notches 16 communicating with two of the four holes 15 when it is brought into contact with the front of the projecting end of the plunger.

The plunger is in sliding contact with the inner periphery of the cylinder with O-rings fitted on the outer periphery of the plunger slightly rearward of the end projecting into the cylinder.

FIG. 4 shows a major portion of the plunger 2 projecting outwardly from the rod end of the cylinder 1. At this time, the floating piston 7 in the plunger space is located inside the front end of the space 3.

Figure 6:
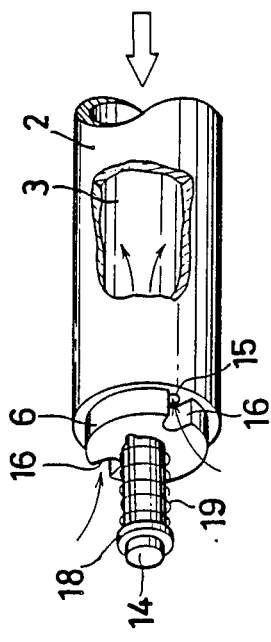
FIG. 6 is an enlarged-scale perspective view showing the end of the plunger of the oil damper of FIG. 4.

When the plunger 2 undergoes a contraction stroke with application of a force F1 applied to it in a direction of forcing it into the cylinder 1, the valve 6 is brought into contact with the front of the projecting end of the plunger. As a result, two of the four small holes 15 are opened by the notches 16, but the other two are closed. Thus, the oil 4a in the cylinder can enter the space 3 of the plunger only through the two small holes opened by the notches 16 as shown in FIG. 6 (see FIGS. 5 and 6). Thus, the floating piston 7 is retracted against the spring 8 by the oil 4b entering the space of the plunger.

Figure 7:
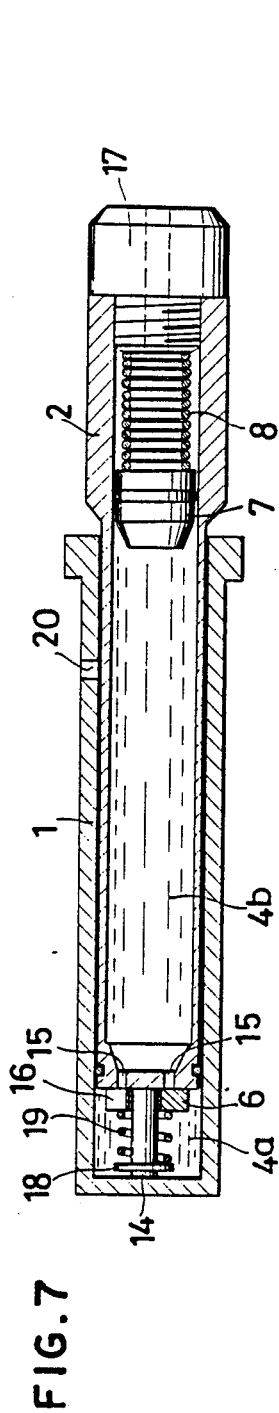
FIG. 7 is a sectional view showing the oil damper of FIG. 4 with the plunger in the contracted state.
Figure 8:
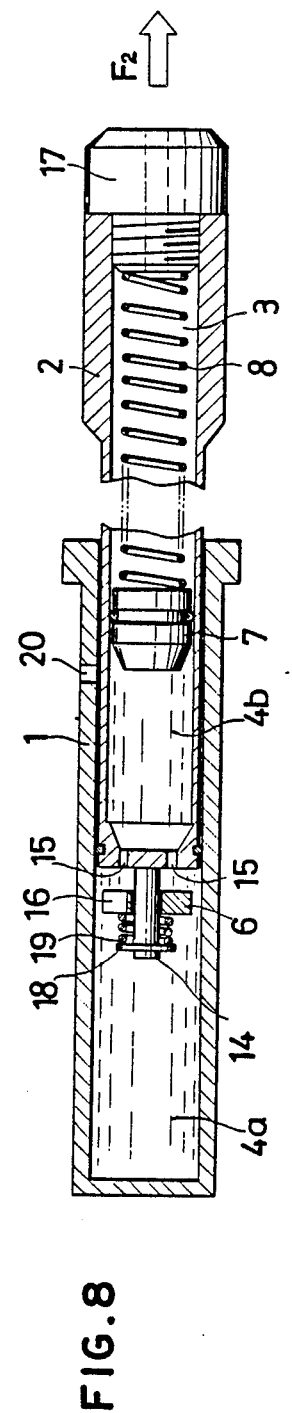
FIG. 8 is a sectional view showing the plunger of the oil damper of FIG. 4 during the elongation stroke.
Figure 9:
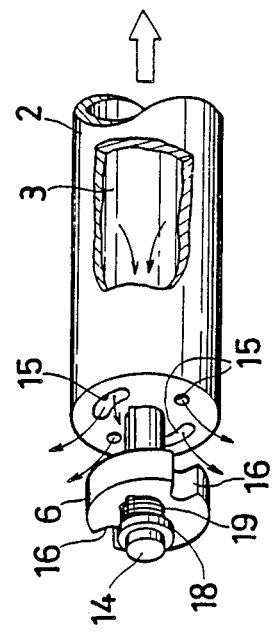
FIG. 9 is an enlarged-scale perspective view showing the end of the plunger of the oil damper of FIG. 4.

FIG. 7 shows the plunger having completed the contraction stroke in the above way. Almost all oil is collected in the plunger space 3. When the plunger experiences a tensile force F2 (FIG. 8), it is attracted by the negative pressure produced in the cylinder. Thus, the valve 6 is advanced and is separated from the front side of the projecting end of the plunger. Thus, the oil 4b in the plunger space enters the cylinder through the four open small holes 15. The plunger thus performs the elongation stroke smoothly, so that there results an elongated state as shown in FIG. 4.

In this case, the floating piston 7 is advanced by the restoring force of the spring 8 as in the first embodiment according to the movement of oil in the cylinder. In this embodiment, when the plunger is elongated to result in the elongated state, the floating piston 7 is brought into contact with the front end of the plunger space 3. However, it is also possible that there is maintained a space in which the oil 4b is held.

Reference numeral 20 shows holes for purging air from the inside of the cylinder 1 at the time of assembly.

In either embodiment, when the ambient temperature around the cylinder 1 becomes higher so that oil undergoes volume expansion, irrespective of whether the plunger is in the elongated state or contracted state or in an intermediate state, the floating piston is moved against the spring 8 to absorb the volume expansion of oil.

In the embodiment shown in FIGS. 4 to 9, the rear end of the plunger space is provided with a threaded plug 17 having an axial through-hole.

An annular ring 18 is mounted on the end of the shaft 14, and a spring 19 is fitted on the shaft 14 between the annular ring 18 and the valve 6. In this arrangement, when the plunger is elongated, the valve 6 is urged by the plunger to be brought into contact with the front surface of the plunger by the spring 19 to close two of the four small holes 15. Thus, it is possible to prevent sudden movement of the valve 6 in the subsequent contraction stroke until some of the communication holes are closed.

According to the invention, it is possible to provide an elongation type oil cylinder which permits a portion of the rod for entering and leaving the cylinder to have a size up to equal that of the inner diameter of the cylinder in spite of the fact that it is an elongation type oil damper in which a flange-like piston is inserted into the cylinder such that the rod projects from the rod end, and particularly the invention is suited for use in a case where a cylinder having a small inner diameter is used.

What is claimed is:

1. An elongation type oil damper comprising a closed cylinder having a bore containing oil, a hollow plunger having an inner end sealingly and slidably fitted in said cylinder bore and also containing oil in a hollow space thereof, said plunger including an outer end projecting from a rod end of said cylinder and being movable through an elongation stroke and a contraction stroke, said plunger being provided through the end face of said inner end with a plurality of communication holes through which the oil in said hollow space and the oil in said cylinder bore join each other, said holes providing the only path of fluid communication between said bore and said hollow space, said plunger including an axial extension at said inner end projecting into said bore, said extension comprising a stem fast therewith projecting from said plunger's inner end into said bore, a single axially floating valve located between said cylinder bore and at least some of said communication holes and axially slidable relative to and retained by said stem of said axial extension, said valve being movable axially for closing at least one but less than all of said communication holes during a contraction stroke of said plunger and for opening said communication holes during an elongation stroke of said plunger, a floating piston axially movable within said hollow space of said plunger and sealing the outer end of said plunger, and spring means in said plunger connected to said plunger's outer end for resiliently biasing said floating piston toward said inner end of said plunger, said valve further comprising a valve element slidably disposed on said stem, said element being biased toward the front surface of said plunger by spring means situated between said valve element and annular ring mounted on said stem, said holes of said plunger being located so as to intersect an inner end face and said plunge, said valve element being engageable with said plunger face for closing certain of said holes, and said valve element including a notch therein aligned with at least one of said holes of said plunger for avoiding closing said one hole.

2. An elongation type oil damper comprising a closed cylinder having a bore containing oil, a hollow plunger having an inner end sealingly and slidably fitted in said cylinder bore and also containing oil in a hollow space thereof, said plunger including an outer end projecting from a rod end of said cylinder and being movable through an elongation stroke and a contraction stroke, said plunger comprising a slide section in direct sliding contact with the inner periphery of the cylinder and comprising an axially extending, cylindrical projection which projects into the cylinder, said projection having a reduced diameter thus radially spaced from the inner periphery of said cylinder and said projection being open at the front, an axially, single floating valve movable directly in the inner periphery of the cylindrical projection provided with a plurality of circumferentially spaced, deformed check pawls, the cylindrical projection provided at its rear inner end between said projection and slide section with a plurality of large holes through which the oil in said hollow space and the oil in said cylinder bore join each other, the valve including a constantly or continously open, small axial central through-hole, the large holes and through-hole providing the only path of fluid communication between said bore and said hollow space, the axially floating valve located between said bore and at least some of said communication holes and axially slidable relative to and retained by said axial projection, said valve being movable axially for closing said large communication holes during an elongation stroke of said plunger, a floating piston axially movable within said hollow space and sealing the outer end of said plunger, and spring means in said plunger connected to said plunger's outer end for resiliently biasing said floating piston toward said inner end, said valve being disposed in said cylindrical projection in axial sliding contact with the inner periphery of the cylindrical projection such that the valve is retained by said check pawl means, the valve being tapered toward the slide section to engage a corresponding tapered surface of said slide section acting as a seat for said valve to close the large holes thus permitting fluid flow communication only through the small axial constantly or continuously open through-hole in the floating valve.

* * * * *